United States Patent
Jiang (10) Patent No.: US 10,896,017 B2
(45) Date of Patent: Jan. 19, 2021

(54) MULTI-PANEL DISPLAY SYSTEM AND METHOD FOR JOINTLY DISPLAYING A SCENE

(71) Applicant: Yu-Sian Jiang, Austin, TX (US)

(72) Inventor: Yu-Sian Jiang, Austin, TX (US)

( * ) Notice: Subject to any disclaimer, the term of this patent is extended or adjusted under 35 U.S.C. 154(b) by 0 days.

(21) Appl. No.: 16/679,150

(22) Filed: Nov. 9, 2019

(65) Prior Publication Data
US 2020/0150916 A1    May 14, 2020

Related U.S. Application Data (60) Provisional application No. 62/757,748, filed on Nov. 8, 2018.

(51) Int. Cl.
| | | |
|---|---|---|
| G06F 3/14 | (2006.01) | |
| B60R 11/02 | (2006.01) | |
| B60K 37/04 | (2006.01) | |
| G06F 3/01 | (2006.01) | |
| B60R 11/04 | (2006.01) | |
| G09G 5/00 | (2006.01) | |

(52) U.S. Cl.
CPC ............ *G06F 3/1446* (2013.01); *B60K 37/04* (2013.01); *B60R 11/0235* (2013.01); *B60R 11/04* (2013.01); *G06F 3/013* (2013.01); *G09G 5/006* (2013.01); *B60R 2300/303* (2013.01); *B60R 2300/605* (2013.01); *G09G 2300/026* (2013.01); *G09G 2380/10* (2013.01)

(58) Field of Classification Search
CPC ....... G06F 3/1446; G06F 3/013; B60K 37/04; B60R 11/0235; B60R 11/04; B60R 2300/303; B60R 2300/605; G09G 5/006; G09G 2300/026; G09G 2380/10
USPC .......................................................... 348/837
See application file for complete search history.

(56) References Cited

U.S. PATENT DOCUMENTS

| | | | | |
|---|---|---|---|---|
| 9,256,791 B2* | 2/2016 | Stein | ................. | G06K 9/00798 |
| 2009/0244267 A1* | 10/2009 | Yuan | .................... | G06T 15/20 |
| | | | | 348/51 |
| 2010/0053164 A1* | 3/2010 | Imai | ..................... | G06F 3/1446 |
| | | | | 345/427 |
| 2010/0110069 A1* | 5/2010 | Yuan | .................... | G06T 15/20 |
| | | | | 345/419 |
| 2011/0109526 A1* | 5/2011 | Bauza | ..................... | G06F 3/147 |
| | | | | 345/1.3 |

(Continued)

FOREIGN PATENT DOCUMENTS

JP    2013024662 A    *    2/2013

*Primary Examiner* — Christopher S Kelley
*Assistant Examiner* — Kathleen M Walsh (57) ABSTRACT

A display system is provided. The display system includes a first display panel, a second display panel, and a processing unit. The first display panel is configured to display a first content. The second display panel is configured to display a second content, where a gap is between a frame of the first display panel and a frame of the second display panel, and the first content and the second content share a same 3D world coordinate. The processing unit is configured to establish a scene, where the scene is jointly displayed by the first content rendered in the first display panel and the second content rendered in the second display panel. The scene includes a third content that is not shown on the first display panel or the second display panel.

20 Claims, 12 Drawing Sheets

(56) References Cited

U.S. PATENT DOCUMENTS

| | | | | |
|---|---|---|---|---|
| 2013/0086514 | A1* | 4/2013 | Rasmussen | G06F 3/1446 |
| | | | | 715/792 |
| 2013/0265487 | A1* | 10/2013 | Yu | G06F 3/1446 |
| | | | | 348/383 |
| 2014/0072030 | A1* | 3/2014 | Zhou | H04N 19/86 |
| | | | | 375/240.02 |
| 2014/0309864 | A1* | 10/2014 | Ricci | A61B 5/4809 |
| | | | | 701/36 |
| 2015/0154461 | A1* | 6/2015 | Kitaura | G06K 9/00604 |
| | | | | 348/148 |
| 2015/0245017 | A1* | 8/2015 | Di Censo | B60K 31/0008 |
| | | | | 348/51 |
| 2015/0370322 | A1* | 12/2015 | Gustafson | G09G 5/363 |
| | | | | 345/156 |
| 2018/0079429 | A1* | 3/2018 | Prokhorov | H04W 4/40 |
| 2019/0283607 | A1* | 9/2019 | Murao | H04N 13/156 |

* cited by examiner

FIG. 8B

MULTI-PANEL DISPLAY SYSTEM AND METHOD FOR JOINTLY DISPLAYING A SCENE

CROSS REFERENCE

This application claims the benefit and priority to of U.S. Provisional Application Ser. No. 62/757,748, filed on Nov. 8, 2018, and entitled "MULTI-PANEL DISPLAY SYSTEM AND METHOD", which is incorporated herein by reference in its entirety.

FIELD

The present disclosure generally relates to a multi-panel display system, a vehicle having a multi-panel display system and method for jointly displaying a scene on a multi-panel display system.

BACKGROUND

Conventional display systems may use multiple panels or screens to jointly display a scene in order to achieve a greater size of viewing. Each panel displays a sub-content of the whole scene, and the multiple panels are arranged to connect with each other on a same plane. The sub-contents of each panel are stitched together to create the illusion of a larger screen. However, in an application when the panels are separately arranged without connecting with each other, or the panels are arranged by different orientation, it cannot deliver the illusion of the whole scene. Therefore, it is desirable to provide a display system to present a full scene illusion when the multiple panels are arranged in a space without stitching together and/or having different orientations.

SUMMARY

In one aspect of the present disclosure, a display system is provided. The display system includes a first display panel, a second display panel, and a processing unit. The first display panel is configured to display a first content. The second display panel is configured to display a second content, where a gap is between a frame of the first display panel and a frame of the second display panel, and the first content and the second content share a same 3D world coordinate. The said frame of the panel defines the physical boundary of the display device. The processing unit is configured to establish a full content of a scene. The full content comprises a first content, a second content, and a third content. The scene is jointly displayed by the first content rendered to the first display panel and the second content rendered to the second display panel. The third content continuously bridges the first content and the second content but is not shown on the first display panel or the second display panel.

In another aspect of the present disclosure, a method for jointly displaying a scene on a first display panel and a second display panel is provided, where a gap is between a frame of the first display panel and a frame of the second display panel, and the first content and the second content share a same 3D world coordinate. The method includes the following actions. A full content of a scene in the 3D world coordinate is established by a processing unit, and the full content comprises a first content, a second content, and a third content. The scene is jointly displayed by the first content rendered to the first display panel and the second content rendered to the second display panel. The third content continuously bridges the first content and the second content but is not shown on the first display panel or the second display panel.

In yet another aspect of the present disclosure, a vehicle is provided. The vehicle includes a display system, wherein the display system includes an infotainment display, a dashboard display, and a processing unit. The infotainment display is configured to display an application content. The dashboard display is configured to display vehicle instrument content. The contents comprise objects and layers for representing the scene. The objects and layers of the contents rendered in the dashboard display and the infotainment display share a same 3D world coordinate. The processing unit is configured to establish a full content of a scene, and the scene comprises the application content, the vehicle instrument content, and a bridging content. The bringing content continuously bridges and stitches the application content and the vehicle instrument content but is not shown on the first display panel or the second display panel, wherein the scene is jointly displayed by the application content rendered to the infotainment display and the vehicle instrument content rendered in the dashboard display.

DETAILED DESCRIPTION

The following description contains specific information pertaining to exemplary implementations in the present disclosure. The drawings in the present disclosure and their accompanying detailed description are directed to merely exemplary implementations. However, the present disclosure is not limited to merely these exemplary implementations. Other variations and implementations of the present disclosure will occur to those skilled in the art. Unless noted otherwise, like or corresponding elements among the figures may be indicated by like or corresponding reference numerals. Moreover, the drawings and illustrations in the present disclosure are generally not to scale, and are not intended to correspond to actual relative dimensions.

Figure 1:
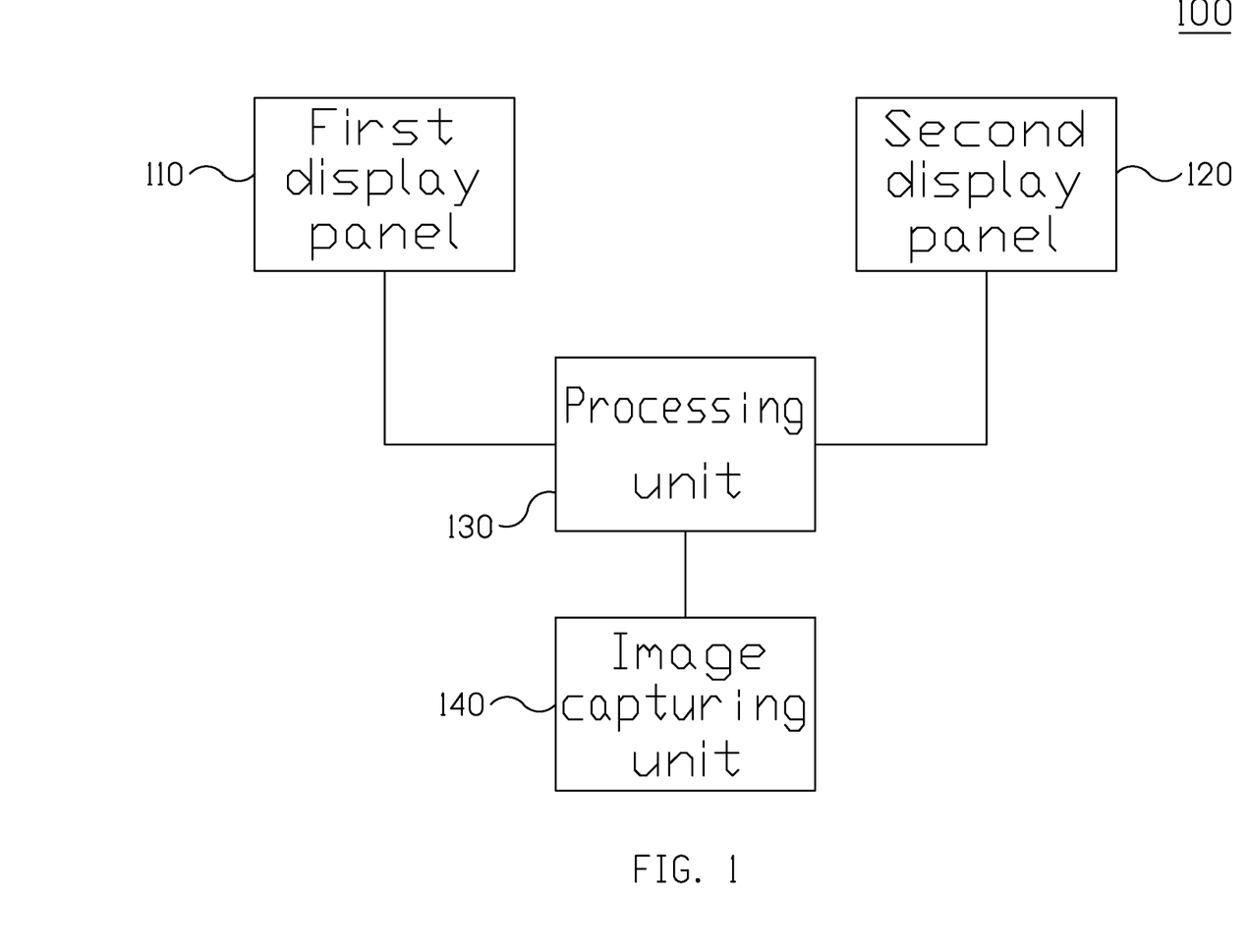
FIG. 1 is a block diagram of a display system according to an implementation of the present disclosure.

FIG. 1 is a block diagram of a display system 100 according to an implementation of the present disclosure. The display system 100 includes two or more display panels 110 and 120, and a processing unit 130. The first display panel 110 is configured to display images of a first content. The second display panel 120 is configured to display images of a second content.

The processing unit 130 is coupled to the image capturing unit 140, the first display panel 110, and the second display panel 120. The processing unit 130 may process data and instructions. In one embodiment, the processing unit 130 may be a hardware module comprising one or more central processing unit (CPU), microcontroller(s), ASIC, or a combination of above but is not limited thereof. The processing unit 130 may process data and instructions. The processing unit 130 performs image recognition and image processing to render images. In one embodiment, the processing unit 130 is configured to identify the captured images and perform facial detection on the captured images. In some embodiments, the processing unit 130 further identify a facial feature and other biometric recognition based on the captured images. In some embodiments, the processing unit 130 further performs facial recognition, and in some embodiments, the processing unit 130 performs the head pose detection and gaze detection.

Optionally, the display system 100 further includes an image capturing unit 140 configured to capture images of a viewer. In one implementation, the image capturing unit 140 may include, but not limited to, one or more cameras or any device capable of capturing images. The image capturing unit 140 may be a depth-sensing camera with a depth sensor. The camera may be an RGB color camera or an infrared (IR) camera, or an RGBIR camera. In some embodiments, the image capturing unit 140 further includes a light source (e.g., an IR LED or a visible light illuminator) enabling instant profiling of the user. With the light source and high dynamic range (HDR) imaging, the image processing, or the object identification/recognition based on the captured images may be adapted to a darker environment.

Figure 2A:
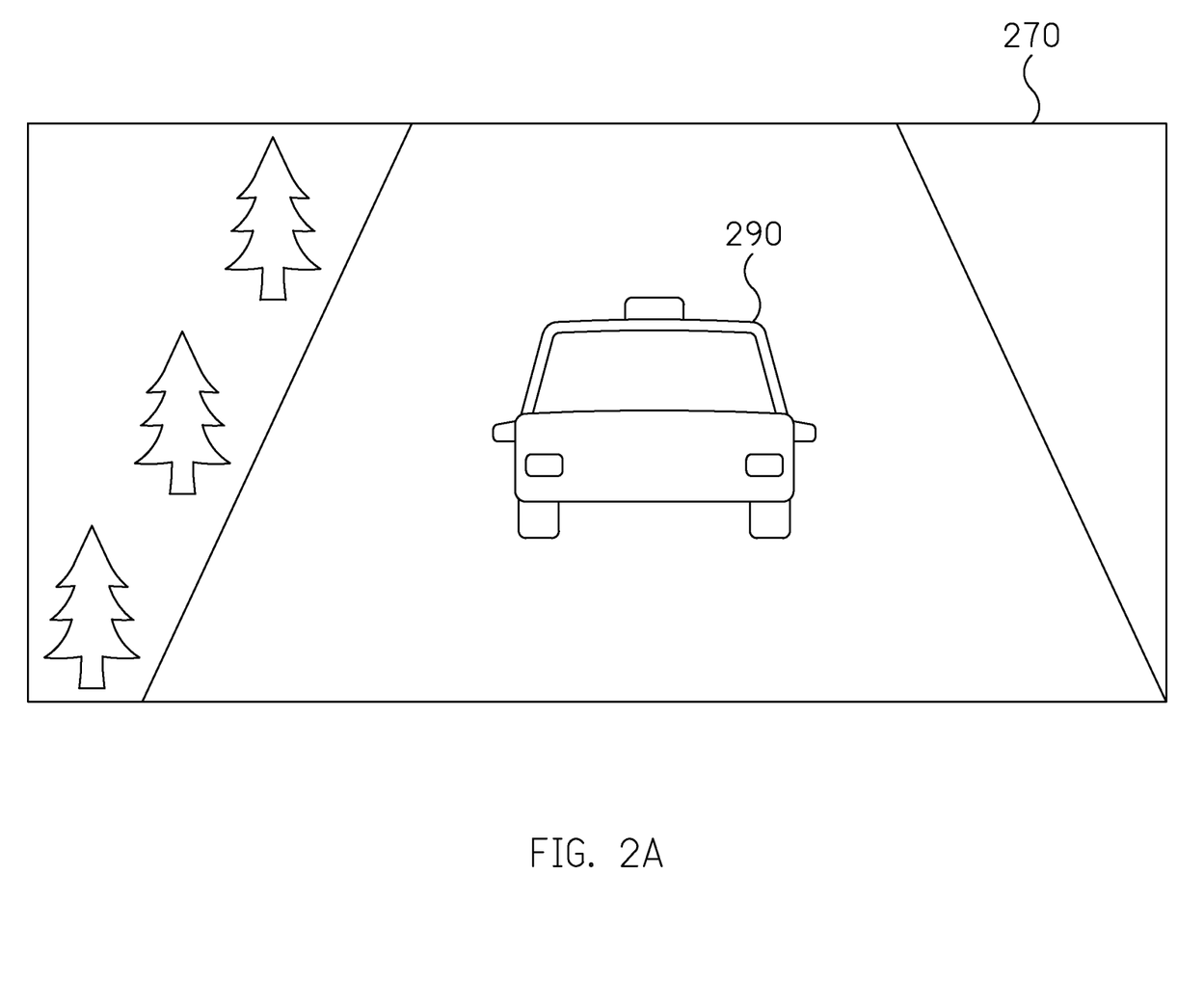
FIGS. 2A-2C are schematic diagrams of an image displayed by a conventional display system with multiple display panels.
Figure 2B:
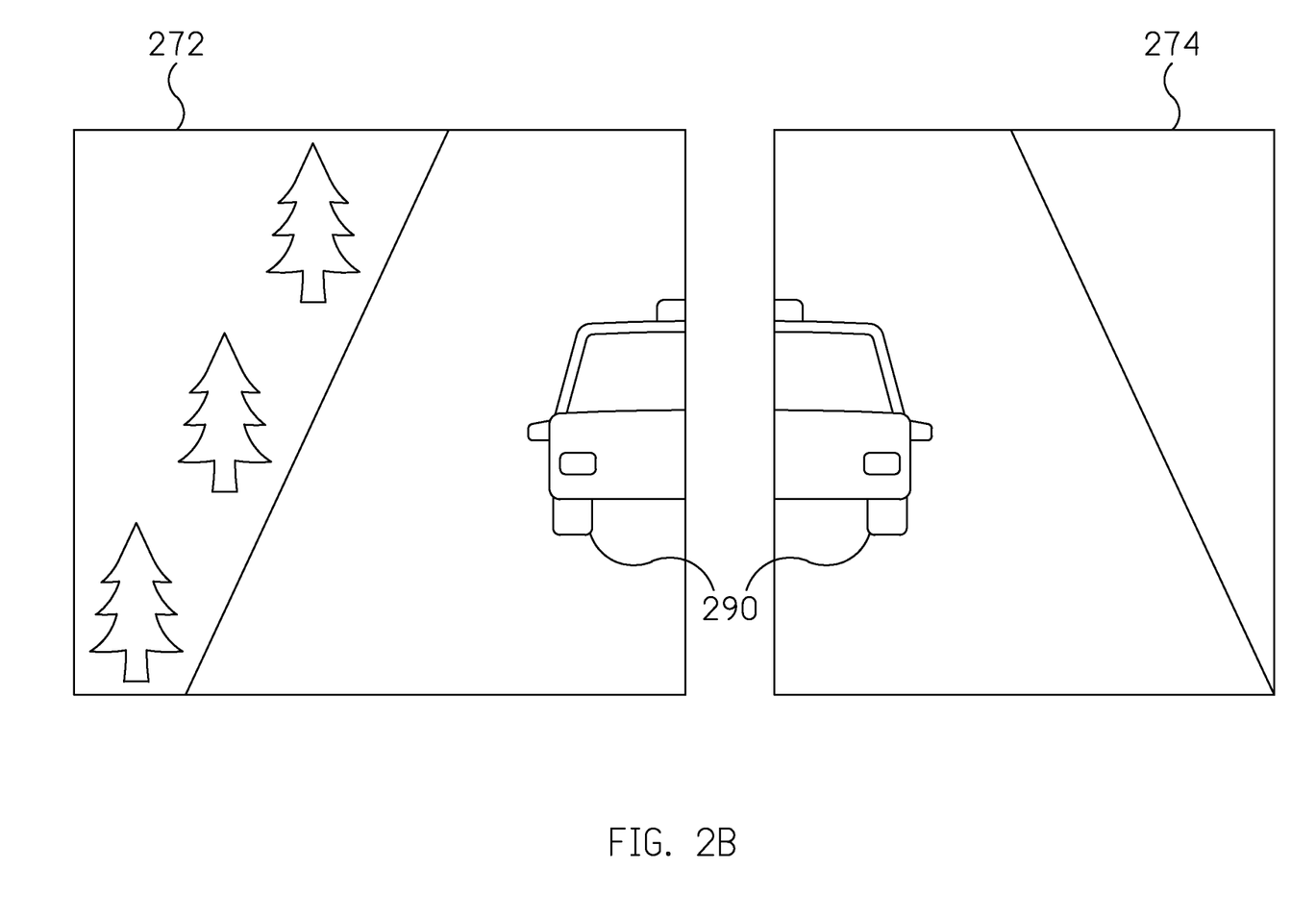
Figure 2C:
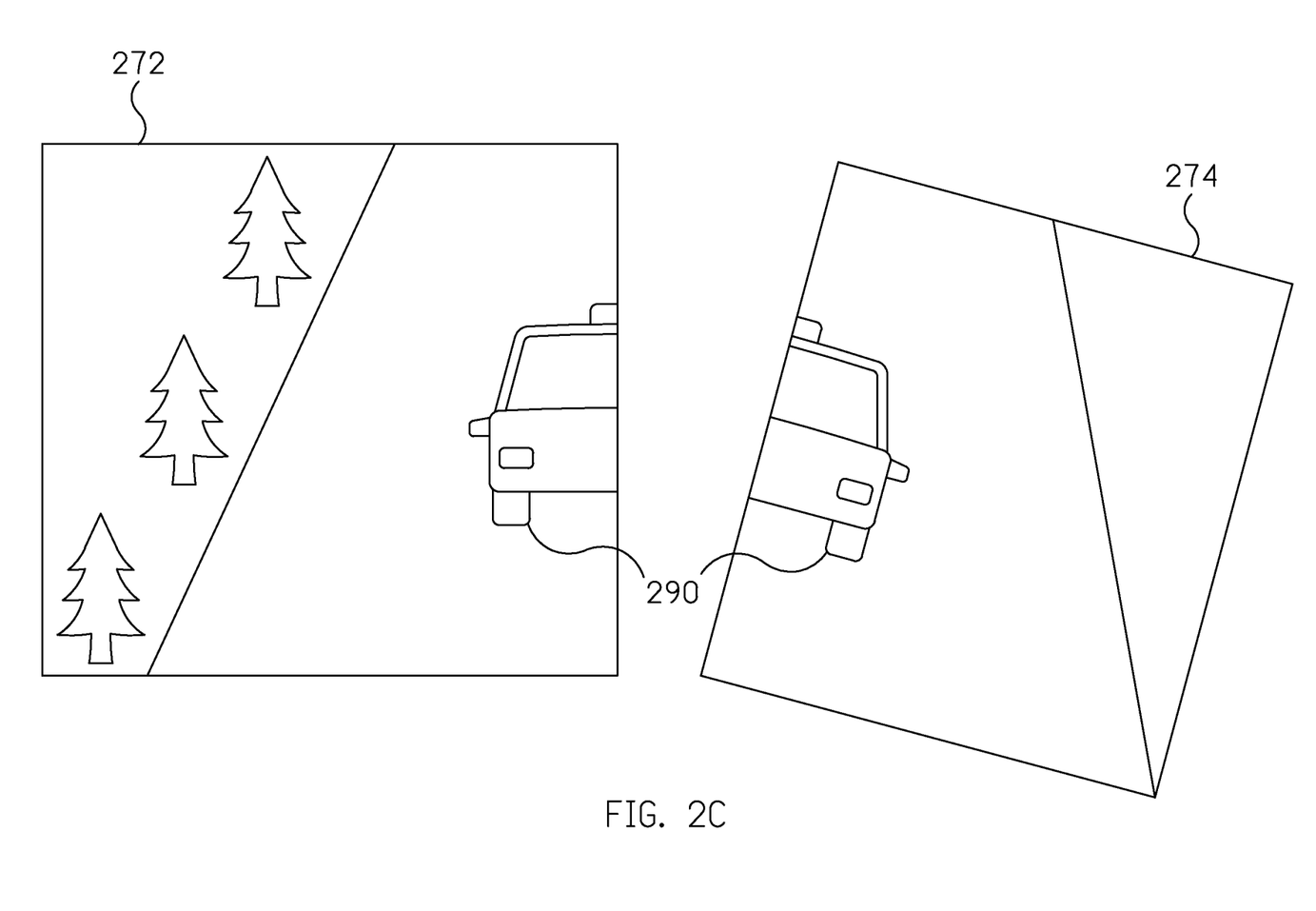

Conventionally, in order to jointly display an image on the two display panels, the image would be divided into two parts and each part is displayed on the respective display panel. Take FIGS. 2A-2C for illustration. Suppose that the image 270 includes a road, trees and a vehicle. As shown in FIG. 2B, the display panel 210 displays the first part 272 of the image including the left part of the road and left part of the vehicle, while the display panel 220 displays the second part 274 of the image including the right part of the road and the right part of the vehicle. However, when the two display panels are not arranged and connected with each other, e.g., there is a gap between the two display panels as shown in FIG. 2B, or the two display panels are not disposed on the same plane as shown in FIG. 2C, the misalignment of the two panels creates a discontinuous image between the two display panels, which is not ideal for the viewer to watch the displayed image. Particularly, the situation is even critical when the viewer focuses on the information in the middle of the image (e.g., the vehicle 290), which is divided to be displayed on the two separate display panels. As a result, since the viewer needs to move his/her eyes constantly between the two display panels, the viewer could not observe the detailed information clearly and easily. Alternatively, the viewer may need to drag the displayed scene to move the viewer's interest target such that the target is displayed on only one of the display panels. In any case, it is not ideal for the viewer to watch the jointly displayed image.

Figure 3:
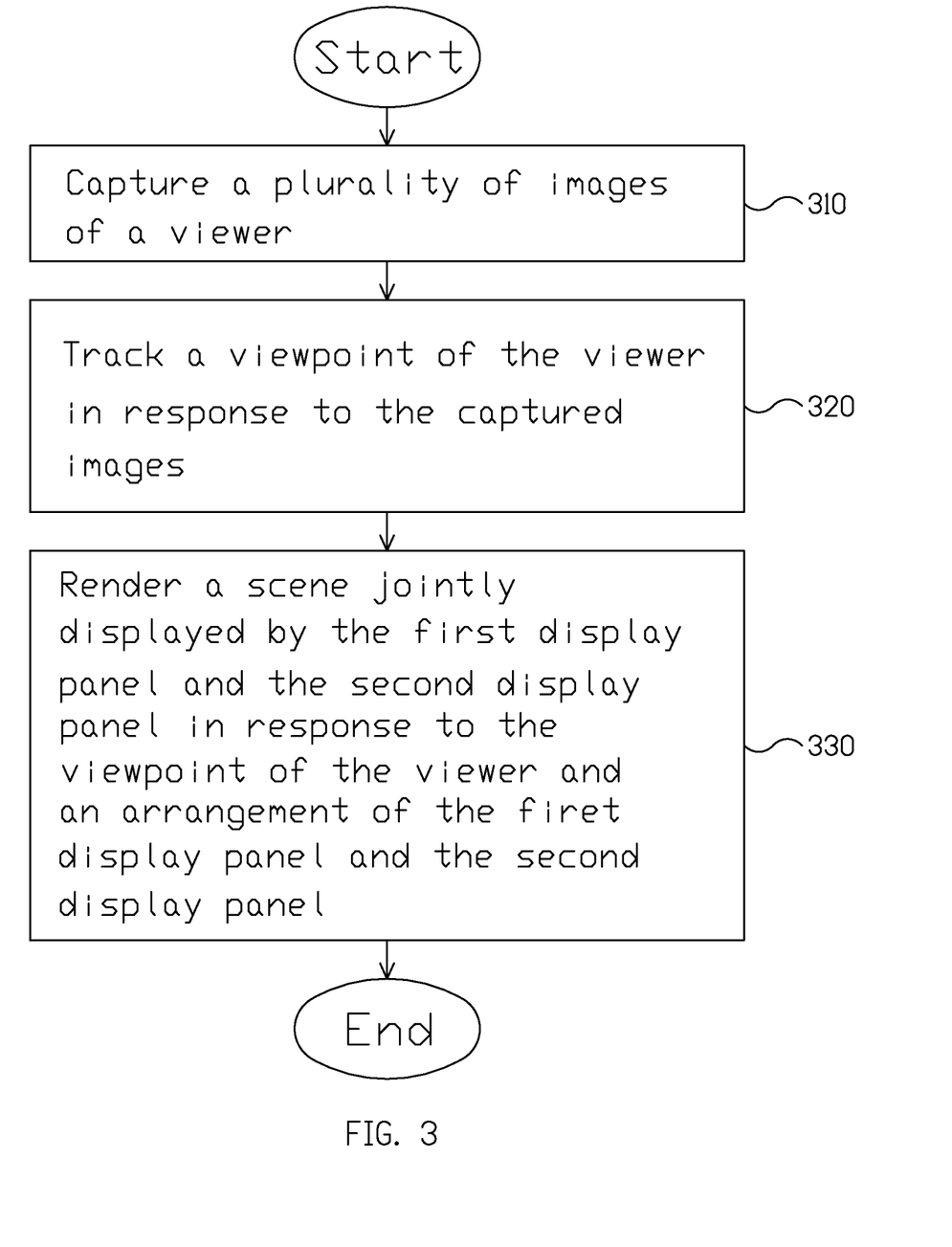
FIG. 3 is a flowchart of the method for displaying a scene on a multi-panel display system according to an embodiment of the present disclosure.

On the contrary, the present disclosure provides a display system and a method for jointly displaying a scene on a multi-panel display system to provide better visual experience. FIG. 3 is a flowchart of the method for displaying a scene on a multi-panel display system (e.g., the display system 100) according to an embodiment of the present disclosure. As stated above, the display system 100 includes a first display panel configured to display a first content and a second display panel configured to display a second content.

In action 310, the image capturing unit captures a plurality of images of a viewer.

In action 320, the processing unit tracks a viewing position and viewing angle of the viewer according to the captured images. For instance, the viewing angle of the viewer is determined according to the head pose of the viewer, wherein the head pose comprises the pitch angle, yaw angle, and roll of the head representing the face orientation and the viewing angle. The processing unit may identify the facial features such as facial landmarks and further determines the head pose of the viewer. Additionally, the processing unit may calculate the head position based on the depth information obtained by a depth sensor or a 3D camera. Alternatively, the head position may be estimated by a direct image processing via a monocular camera. Finally, the viewing position and a viewing angle of the viewer may be calculated based on the relative position and orientation between viewer's head and the display panels. Note that the position and the orientation of the display may be known parameters.

In a further implementation, the viewing position and a viewing angle of the viewer is further determined by the eye position of the viewer. The eye position may be calculated by the facial features such as the facial landmark. And the facial landmark may be derived from the face detection or recognition based on the captured images.

In some embodiments, the processing unit tracks the dynamic changes of the head position, head pose, and updates viewing position and viewing angle accordingly.

In some other embodiment, the scene displayed by the display system is dynamically rendered and displayed according to the viewing position and viewing angle of the viewer.

In action 330, the processing unit renders a scene jointly displayed by the first display panel and the second display panel according to the viewing position and a viewing angle of the viewer and an arrangement of the first display panel and the second display panel. That is, the processing unit obtains the arrangement of the first display panel and the second display panel such as the positions, sizes and orientations of each display panel. The processing unit calculates the relative position of the viewing position and a viewing angle of the viewer with the two display panels, and constructs the scene corresponding to the viewing position and a viewing angle of the viewer. The constructed scene provides a visual experience corresponding to the view in real space based on a 3D world coordinate. For example, the scene including multiple contents are separately displayed by multiple display panels, where the first panel displays a first content, and the second display panel displays a second content correspondingly, while a third content corresponding to the gap between the first display panel and the second display panel, is not displayed by the first display panel and the second display panel. In other words, the display system provides a visual effect similar to the real-life experience that the viewer is looking through two windows, and a part of the view is blocked by the window frame.

In one embodiment, the content of the scene is established in a 3D world coordinate, wherein the first content and the second content share the same 3D world coordinate. The scene is jointly displayed by the first content rendered to the first display panel and the second content rendered to the second display panel, and the scene includes a third content that is not shown on the first display panel or the second display panel.

In the present disclosure, the content typically means overall displayed layers inside the panel; while the object means a specific shape formed by a combination of layers. The layer mentioned is often used in computer graphics. For example, a shape, e.g. rectangle, with a specific color. Render means to put the object together in one single frame, and impose special effects onto the frame, for example, create a light from an angle such that the object reflects the light in its 3D surface.

In some embodiments, the scene is constructed according to a virtual space. Specifically, the processing unit establishes the virtual space that allocates the objects of the first content, the second content and the third content according to the 3D world coordinate. The object of the scene displayed in the panel is assigned with a specific world coordinate just like the real world, while the object in the real world (e.g. the panel, the viewer) share a same world coordinate with the object to be displayed. For example, the objects could be located on a plane, a projective plane, a surface, a sphere, or any positions in the virtual space. The processing unit generates a projection of the contents displayed on the first display panel and the second display panel according to the arrangement of the first display panel and the second display panel and the virtual space. For instance, a first content is projected on the first display panel according to the position of the first display panel and the position of the first content in the virtual space. A second content is projected on the second display panel according to the position of the second display panel and the position of the second content in the virtual space. A third content is projected on the first display panel and/or the second display panel according to the arrangement of the first display panel and the second display panel and the position of the third content in the virtual space. In the present disclosure, various types of 3D projection could be used for mapping 3D objects to a two-dimensional plane on the display panel. For example, the contents in a 2D coordinate of the first and second display panels are rendered according to a perspective projection between the objects in the 3D world coordinate, the positions and orientations of the first display panel and the second display panel, and the viewing position and the viewing angle of the viewer. As a result, the virtual space is constructed by the two display panels 110 and 120 and viewed as the space in real life.

In some other embodiments, the virtual space is further established according to the viewing position and a viewing angle of the viewer. For example, the processing unit calculates the viewing position and a viewing angle of the viewer and then present the objects in the virtual space towards the viewer. In other words, the processing unit generates a projection of the contents displayed on the display panels according to the viewing position and a viewing angle of the viewer such that the orientation of the scene face towards the viewer.

Figure 4:
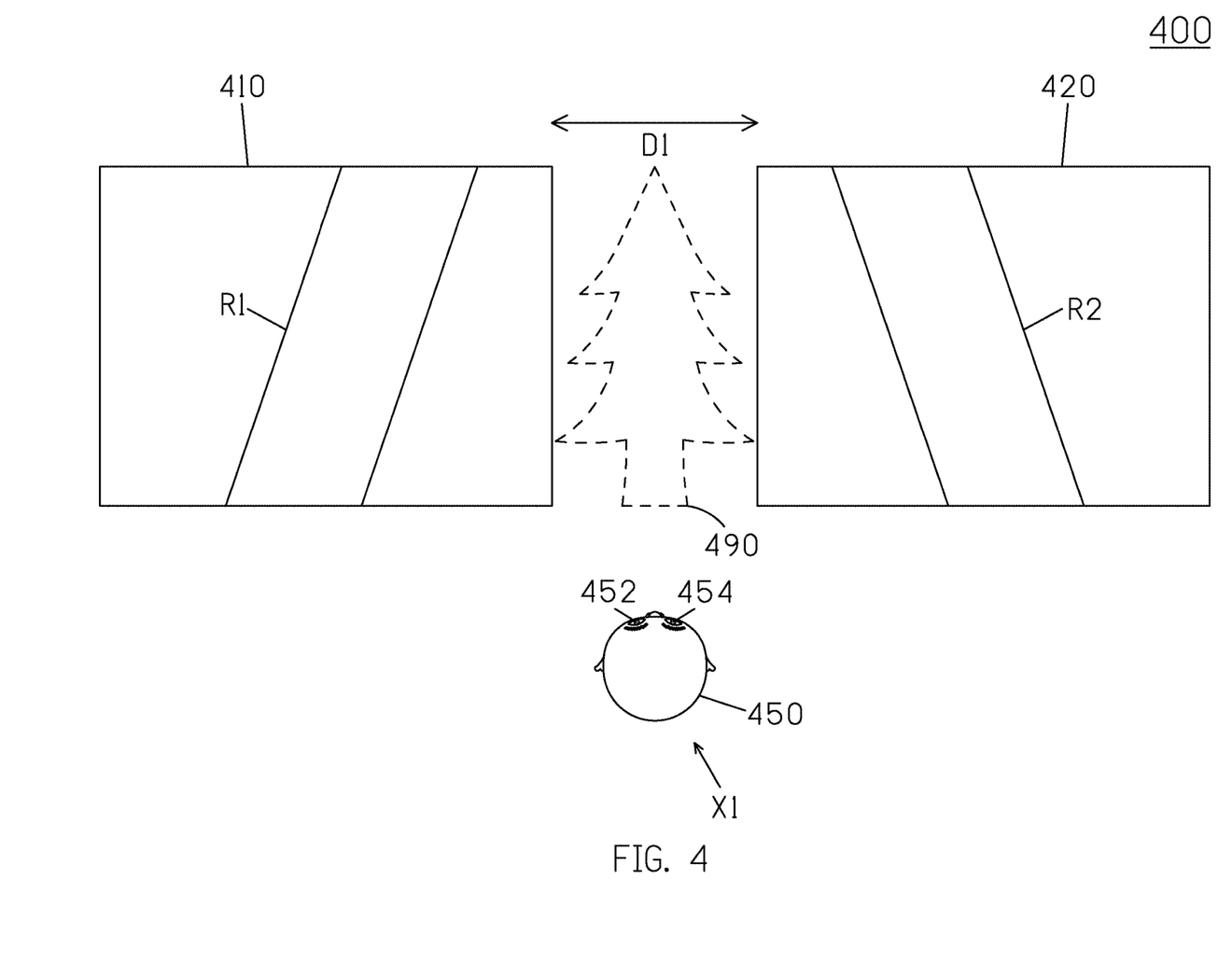
FIG. 4 is a schematic diagram of a scene displayed by a display system according to an implementation of the present disclosure.

FIG. 4 is a schematic diagram of a scene 400 displayed by a display system according to an implementation of the present disclosure. In this implementation, the scene 400 is a forward road view, which includes two roads R1, R2 and a tree 490. The display system includes multiple display panels (e.g., 410 and 420), which has a gap D1 between the two display panels 410 and 420. It is noted that the gap D1 is between a frame of the first display panel and a frame of the second display panel. Specifically, when a viewer's head 450 locates in a central position X1 with two eyes (e.g., 452 and 454) looking ahead, the processing unit determines the tree 490 is not shown on the first display panel and the second display panel due to the gap D1 between the two display panels 410 and 420. As a result, the display panel 410 displays a first image including the road R1, and the display panel 420 displays a second image including the road R2, while the tree is not shown (denoted as the dashed line 490). Therefore, the display system provides a visual effect similar to the real-life experience that the viewer is looking through two windows, and a part of the view (e.g., the tree 490) is blocked by the window frame. It should be noted that, although the frame of the first and second display panel is not shown in FIG. 4, when determining the scene displayed by the display panels 410 and 420, the frame of the display panel(s) is also considered. That is, since the frame of the display panel(s) cannot display images, the content (e.g., the tree) not shown is calculated according to the gap D1 between the two display panels 410 and 420 and the frame size and position of the two display panels 410 and 420.

Figure 5:
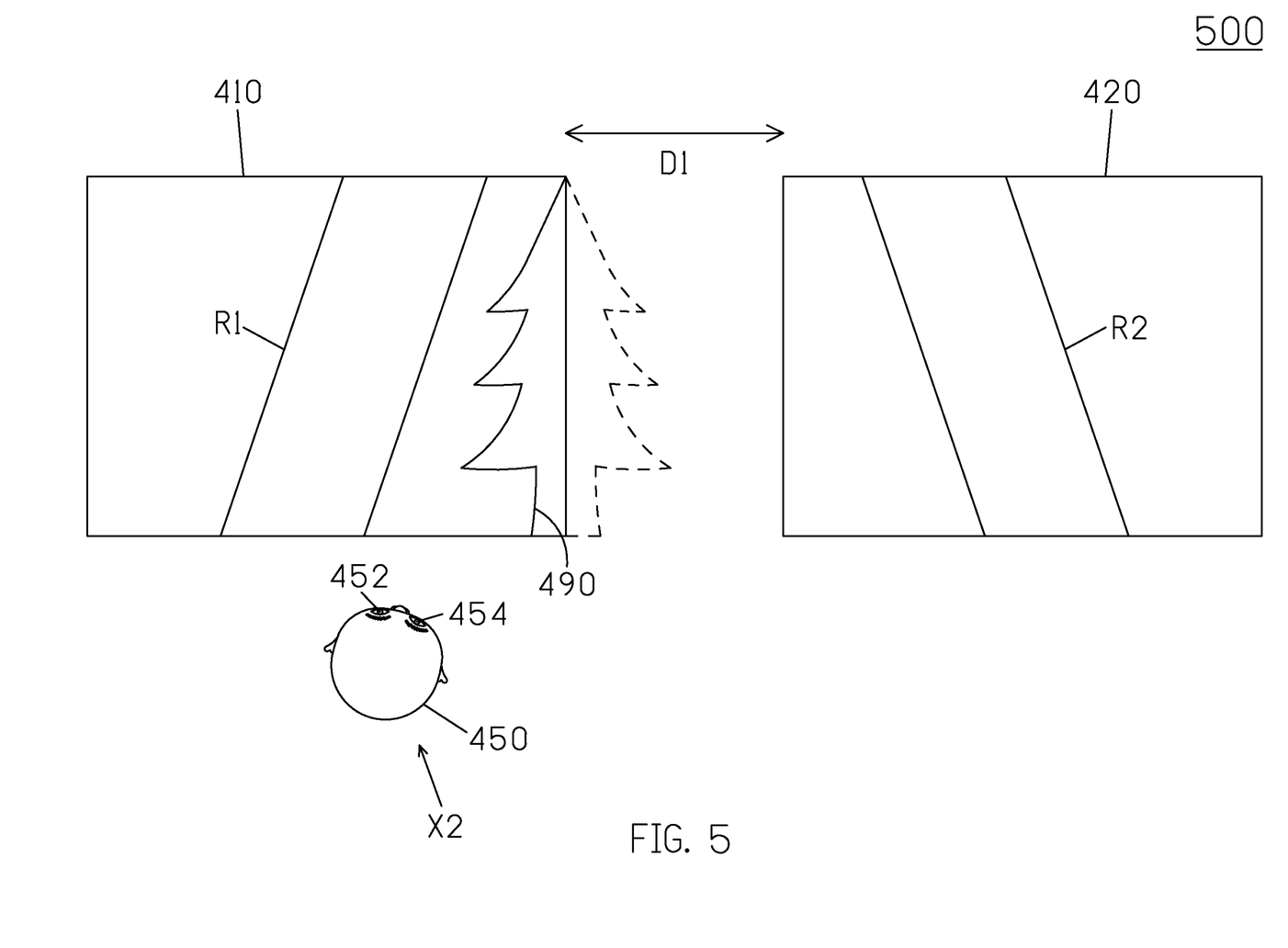
FIG. 5 is a schematic diagram of a scene displayed by a display system according to the viewing position and a viewing angle of the viewer according to another implementation of the present disclosure.

In one embodiment of the present disclosure, the scene displayed by the display system may vary with the viewing position and a viewing angle of the viewer. That is, the display system provides a visual effect similar to the real-life experience that when a part of the view (e.g., the tree 490) is blocked, the viewer changes the viewing position and a viewing angle to observe the tree 490 in a different angle. FIG. 5 is a schematic diagram of a scene 500 displayed by a display system according to the viewing position and a viewing angle of the viewer according to another implementation of the present disclosure. As shown in FIG. 5, when the viewer's head 450 moves to a left position X2 with two eyes (e.g., 452 and 454) looking right, the display panel 410 displays the road R1 and a left side of the tree 490 (denoted as the solid line), and the display panel 420 displays the road R2, while the right side of the tree 490 is not shown (denoted as the dashed line). Furthermore, in one implementation, the orientation of the roads R1 and R2 displayed on the display panels 410 and 420 is adjusted according to the viewing position and a viewing angle of the viewer. That is, since the viewer at the position X2 looks right, the two roads R1 and R2 are displayed with orientations toward right (not shown).

In another implementation, a content object in the first display panel is rendered via a 3D transformation according to the viewing position and the view angle of the viewer, the 3D world coordinate of the content object in the first display panel, and the position and orientation of the first display panel. The same content object is rendered to the second display panel based on a 3D transformation according to the viewing position and the view angle of the viewer, the 3D world coordinate of the content object in the second display panel, and the position and orientation of the second display panel. The content object is viewed from different viewing angle of the viewer. Therefore, the content object rendered by the first display panel and the second display panel appears in different perspective views.

Figure 6:
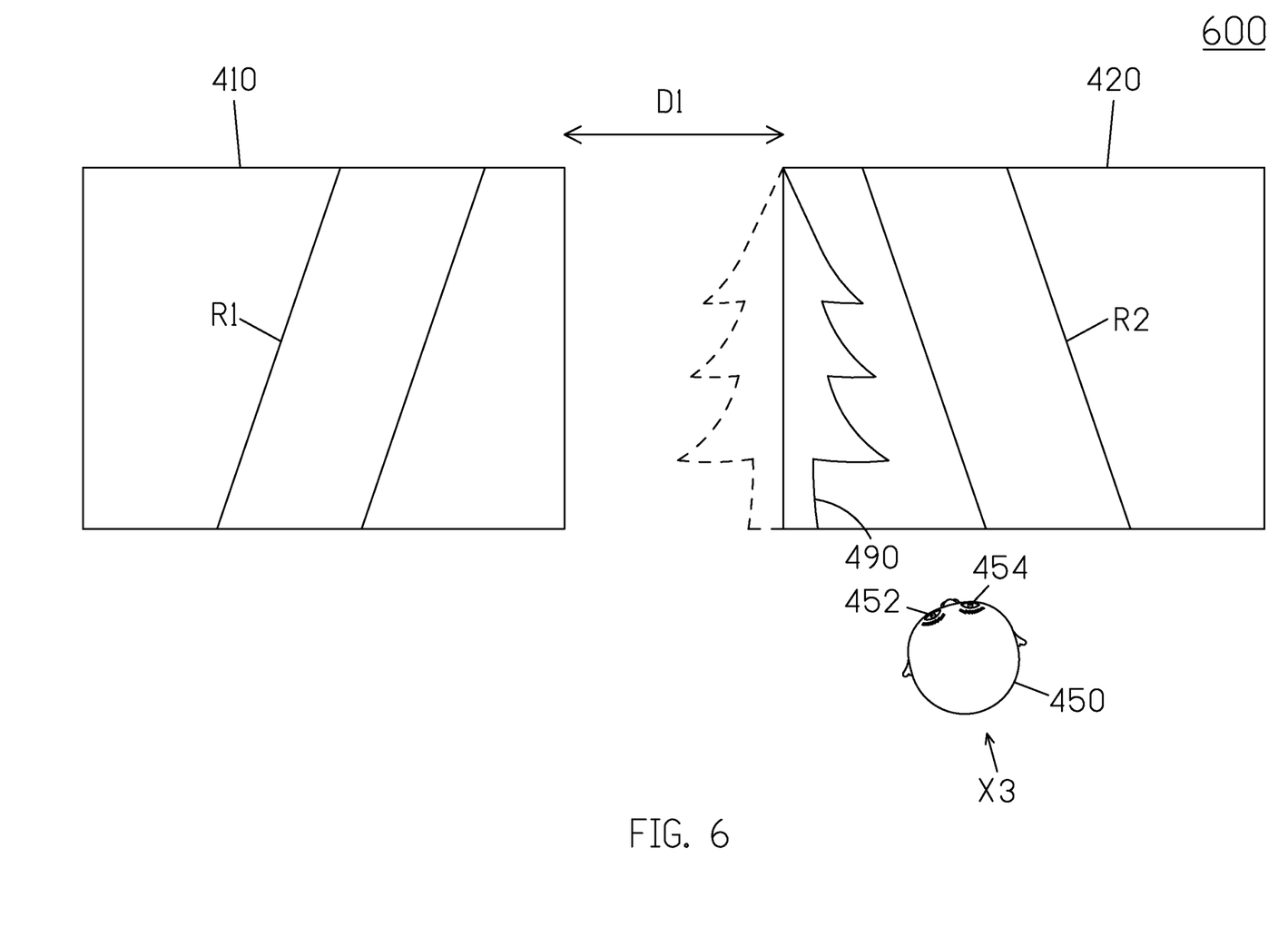
FIG. 6 is a schematic diagram of a scene displayed by a display system according to the viewing position and a viewing angle of the viewer according to yet another implementation of the present disclosure.

FIG. 6 is a schematic diagram of a scene 600 displayed by a display system according to the viewing position and a viewing angle of the viewer according to yet another implementation of the present disclosure. As shown in FIG. 6, in order to observe the right part of the tree, which is blocked (not shown by the display system in FIG. 5), the viewer's head 450 moves to a right position X3 with two eyes (e.g., 452 and 454) looking left. As a result, the display panel 410 displays the road R1, and the display panel 420 displays the road R2 and a right part of the tree 490 (denoted as the solid line), while the left part of the tree 490 is not shown on both display panels (denoted as the dashed line). Furthermore, in one implementation, the orientation of the roads R1 and R2 displayed on the display panels 410 and 420 is adjusted according to the viewing position and a viewing angle of the viewer. That is, since the viewer at the position X3 looks left, the two roads R1 and R2 are displayed with orientations toward left (not shown).

Figure 7A:
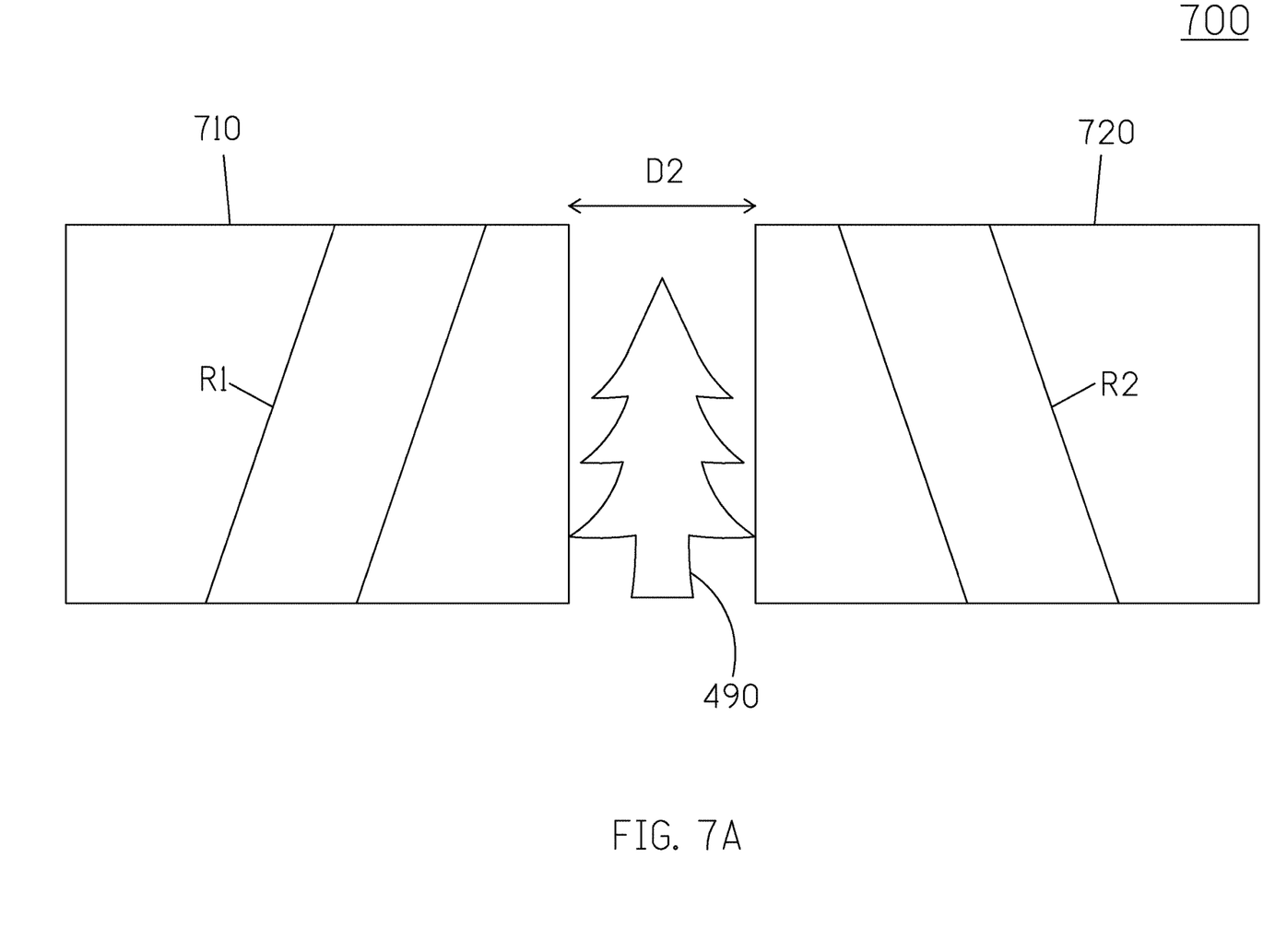
FIGS. 7A and 7B are schematic diagrams of two scenes displayed by a display system according to a movement of the display panel according to another embodiment of the present disclosure.
Figure 7B:
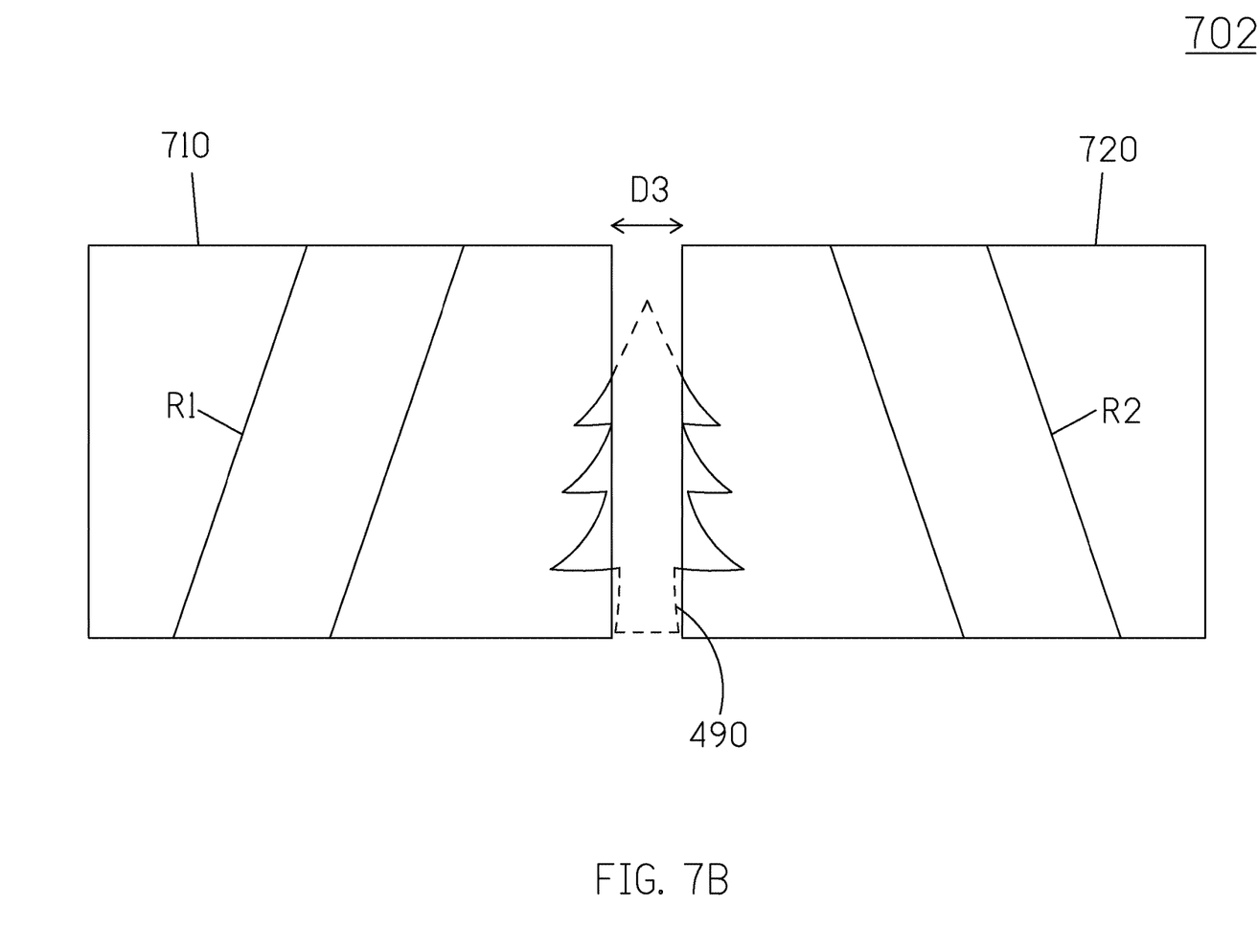

In some embodiments, the position of the first display panel and/or the second display panel is adjustable. That is, the display panels are movable, and the scene displayed by the display system changes accordingly. FIGS. 7A and 7B are schematic diagrams of two scenes 700 and 702 displayed by a display system according to a movement of the display panel according to another embodiment of the present disclosure. As shown in FIG. 7A, there is a gap D2 between the display panels 710 and 720. The display panel 710 displays the road R1, and the display panel 720 displays the road R2, while the tree 490 is not shown (denoted as the dashed line) due to the gap D2 between the two display panels 710 and 720. However, as the display panel 710 and/or the display panel 720 moves closer to each other, the gap between the two display panels is decreased (e.g., D3) as shown in FIG. 7B. After the processing unit detects a movement of the display panel(s), the processing unit determines the movement of the content displayed on the moving display panel(s). Since the scene is presented to the viewer corresponding to the view in real space; from the viewer's perspective, the objects in the scene remains at the same position in space. As a result, while the display panel is moving, the scene displayed by the moving display panel changes. For instance, when both display panels move closer to each other, a part of the tree 490 is displayed on the display panels 710 and 720 (denoted as the solid line). The movement of the content displayed on the moving display panel could be calculated according to the movement of the display panels and the position of the objects in the scene.

Figure 8A:
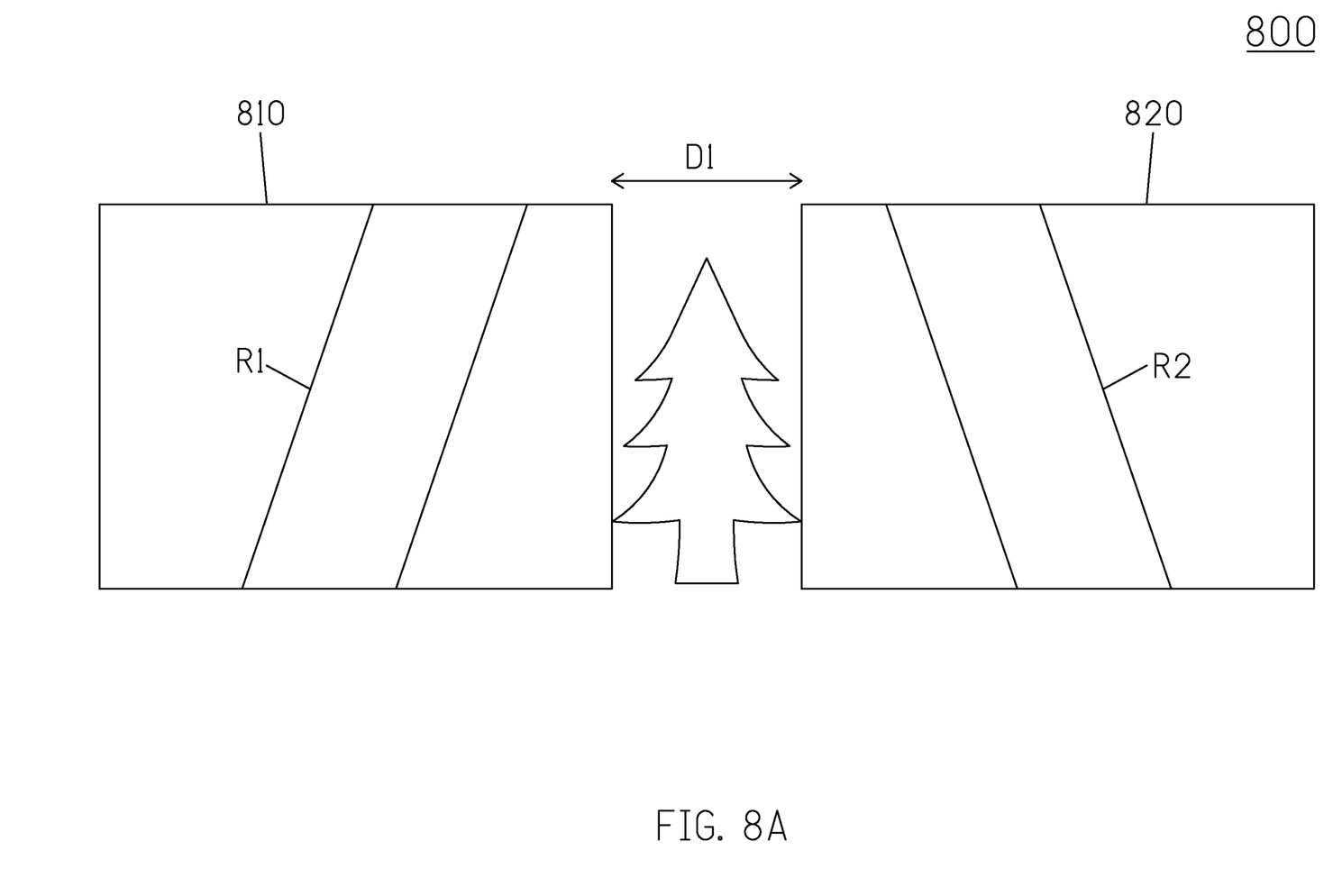
FIGS. 8A and 8B are schematic diagrams of two scenes displayed by a display system according to a movement of the display panel according to yet another embodiment of the present disclosure.
Figure 8B:
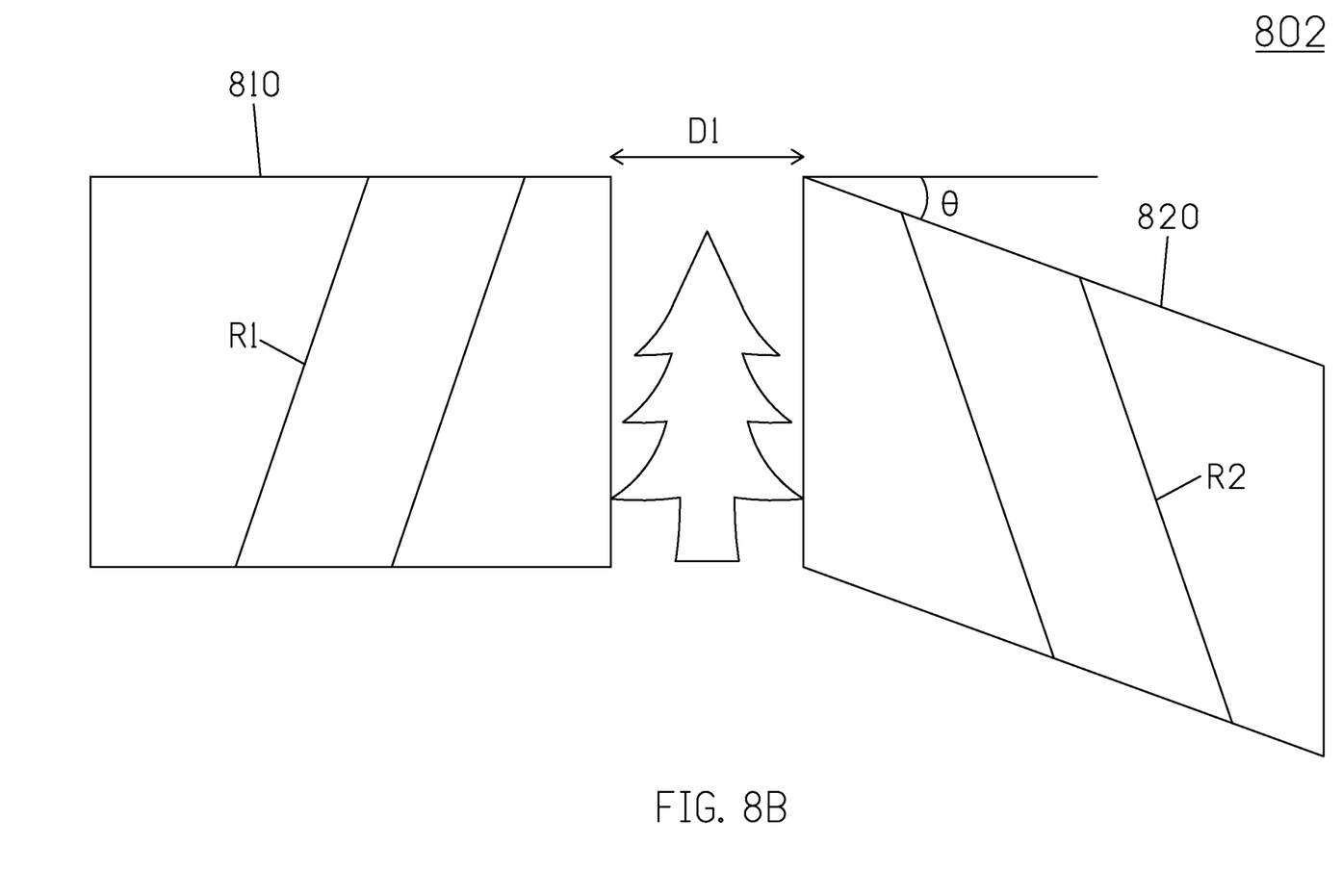

In some other embodiments, the orientation of the first display panel and/or the second display panel is adjustable. In other words, the first display panel and the second display panel are not coplanar. For example, the display panels 810 and 820 are rotatable, and the scene displayed by the display system changes accordingly. FIGS. 8A and 8B are schematic diagrams of two scenes 800 and 802 displayed by a display system according to a movement of the display panel according to yet another embodiment of the present disclosure. As shown in FIG. 8A, the display panels 810 and 820 locate on a plane, and the road R1 and the road R2 are displayed on the display panel 810 and the display panel 820, respectively. In one implementation, as shown in FIG. 8B, the display panel 820 rotates an angle (e.g., θ), and therefore the images displayed on the display panel 820 also changes. After the processing unit detects a rotation of the display panel(s), the processing unit determines a transformation of the content displayed on the rotating display panel(s). Since the scene is presented to the viewer corresponding to the view in real space; from the viewer's perspective, the objects in the scene remains at the same position in space. As a result, while the display panel is rotating, the scene displayed by the rotating display panel changes. For instance, the transformation (e.g., the orientation) of the road R2 displayed on the display panel 820 is adjusted according to the rotation angle θ of the display panel. Specifically, the road R2 is projected on the display panel 820 via 3D projection. The transformation of the content displayed on the rotating display panel could be calculated via 3D projection according to the rotation of the display panels and the position of the objects in the scene.

In one embodiment, the display system is applied to a vehicle. For example, the image capturing unit 140 is disposed inside the vehicle and configured to capture a plurality of images of a driver. The processing unit 130 is an automotive electronic control unit (ECU), and the display system includes two display panels 110 and 120. In one embodiment, the display panel 110 is a digital vehicle instrument cluster, a digital dashboard, or a dashboard display and is configured to display vehicle instrument information. The display panel 120 is a central console or an infotainment display, and the display panel 120 is configured to display an application. In some embodiments, the display system further includes other display panels, such as head-up display.

In one embodiment, the display panel 120 of the central console could be moved to a position near the dashboard for the driver. Therefore, the driver could view the scene jointly displayed by the dashboard and the central console, where the scene includes the application, the vehicle instrument information and a content that is not shown on the infotainment display or the dashboard display. The content could be additional vehicle information or additional application. The driver may observe the additional vehicle information or additional application when the driver changes his/her viewing position and a viewing angle. The displayed scene is in the peripheral vision of the driver when the driver keeps his/her eyes on the road. Furthermore, since the scene is displayed in a 3D virtual space and is rendered real-time corresponding to the viewing position and a viewing angle of the viewer, the display system proposed in the present disclosure provides a more realistic visual effect to the driver. As such, the driver views the continuous scene stitched by multiple display panels without moving his/her gaze between multiple display devices. On top of that, the driver doesn't need to operate the display system to zoom in, zoom out or change the display format of the displayed images, which means that the driver is less distracted, and thus the present disclosure provides a vehicle with a much safer display system and method thereof.

Moreover, the present disclosure presents the experience of a continuous view created by stitching multiple display panels. The scene jointly displayed by the display panels is rendered according to the viewing position and a viewing angle of the viewer. The scene could be rendered in real-time corresponding to the viewing position and a viewing angle of the viewer.

Based on the above, several display systems and methods for jointly displaying a scene on multiple display panels, and vehicles having a multi-panel display system are provided in the present disclosure. The implementations shown and described above are only examples. Even though numerous characteristics and advantages of the present technology have been set forth in the foregoing description, together with details of the structure and function of the present disclosure, the disclosure is illustrative only, and changes may be made in the detail, including in matters of shape, size and arrangement of the parts within the principles of the present disclosure up to, and including, the full extent established by the broad general meaning of the terms used in the claims.

What is claimed is:

1. A display system, comprising:
a first display panel configured to display a first content;
a second display panel configured to display a second content, wherein a gap is between a frame of the first display panel and a frame of the second display panel;
a processing unit configured to perform instructions for:
establishing a content of scene, wherein the scene comprises the first content, the second content, and a third content;
creating a virtual space in which objects of the first content, the second content and the third content are allocated according to a 3D world coordinate;
assigning objects of the first content, the second content and the third content with the 3D world coordinate, wherein the first display panel and the second display panel share the same 3D world coordinate with the objects; and
rendering the first content to the first display panel and the second content to the second display panel in a 2D coordinate according to a perspective projection between the objects in the 3D world coordinate and the positions and orientations of the first display panel and the second display panel in the 3D world coordinate, wherein the third content continuously bridges the first content and the second content but is not shown on the first display panel or the second display panel.

2. The display system of claim 1, wherein the first display panel and the second display panel are not coplanar.

3. The display system of claim 1, further comprising:
an image capturing unit configured to capture a plurality of images of a viewer;
wherein the processing unit is further configured to perform instructions for:
detecting and tracking a viewing position and a viewing angle of the viewer according to the captured images; and
calculating a relative position between the viewer and the first and the second display panels.

4. The display system of claim 3, wherein the first content and the second content is rendered further according to the viewing position and the viewing angle of the viewer.

5. The display system of claim 4, wherein the processing unit is further configured to perform instructions for:
rendering a first 3D transformation of a content object to the first display panel according to the viewing position and the view angle of the viewer, the 3D world coordinate of the content object in the first display panel, and the position and orientation of the first display panel; and
rendering a second 3D transformation of said content object to the second display panel according to the viewing position and the view angle of the viewer, the 3D world coordinate of the content object in the second display panel, and the position and orientation of the second display panel, wherein said content object rendered to the first display panel and the second display panel appears in different perspective views.

6. The display system of claim 1, wherein the position of the first display panel and/or the second display panel is adjustable.

7. The display system of claim 1, wherein the orientation of the first display panel and/or the second display panel is adjustable.

8. A method for jointly displaying a scene on a first display panel and a second display panel, wherein a gap is between a frame of the first display panel and a frame of the second display panel, wherein the method comprises:
establishing, by a processing unit, a content of a scene, wherein the scene comprises the first content, the second content, and a third content;
creating a virtual space in which objects of the first content, the second content and the third content are allocated according to a 3D world coordinate;
assigning objects of the first content, the second content and the third content with the 3D world coordinate, wherein the first display panel and the second display panel share the same 3D world coordinate with the objects; and
rendering the first content to the first display panel and the second content to the second display panel in a 2D coordinate according to a perspective projection between the objects in the 3D world coordinate and the positions and orientations of the first display panel and the second display panel in the 3D world coordinately, wherein the third content continuously bridges the first content and the second content but is not shown on the first display panel or the second display panel.

9. The method of claim 8, wherein the first display panel and the second display panel are not coplanar.

10. The method of claim 8, further comprising:
capturing, by an image capturing unit, a plurality of images of a viewer; and
detecting and tracking, by the processing unit, a viewing position and a viewing angle of the viewer according to the captured images, and calculating a relative position between the viewer and the first and the second display panels.

11. The method of claim 9, wherein the first content and the second content is rendered further according to second the viewing position and the viewing angle of the viewer.

12. The method of claim 11, further comprising:
rendering, by the processing unit, a first 3D transformation of a content object to the first display panel according to the viewing position and the view angle of the viewer, the 3D world coordinate of the content object in the first display panel, and the position and orientation of the first display panel; and
rendering, by the processing unit, a second 3D transformation of said content object to the second display panel according to the viewing position and the view angle of the viewer, the 3D world coordinate of the content object in the second display panel, and the position and orientation of the second display panel, wherein said content object rendered to the first display panel and the second display panel appears in different perspective views.

13. The method of claim 8, wherein the position of the first display panel and/or the second display panel is adjustable.

14. The method of claim 8, wherein the orientation of the first display panel and/or the second display panel is adjustable.

15. A vehicle, comprising:
a display system comprising:
an infotainment display configured to display an application content;

a dashboard display configured to display vehicle instrument content; and a processing unit configured to perform instructions for:

establishing a content of a scene, wherein the scene comprises the application content, the vehicle instrument information content, and a bridging content, the bringing content continuously bridges and stitches the application content and the vehicle instrument information content but is not shown on the infotainment display or the dashboard display;

creating a virtual space in which objects of the application content, the vehicle instrument information content and the bridging content are allocated according to a 3D world coordinate;

assigning objects of the application content, the vehicle instrument information content and the bridging content with the 3D world coordinate, wherein the infotainment display and the dashboard display panel share the same 3D world coordinate with the objects; and rendering the application content to the infotainment display and rendering the vehicle instrument content to the dashboard display in a 2D coordinate according to a perspective projection between the objects in the 3D world coordinate and the positions and orientations of the infotainment display and the dashboard display in the 3D world coordinate.

16. The vehicle of claim 15, further comprising:

an image capturing unit configured to capture a plurality of images of a driver;

wherein the processing unit is further configured to perform instructions for:

detecting and tracking a viewing position and a viewing angle of the driver according to the captured images, and calculating a relative position between the viewer and the infotainment display and the dashboard display.

17. The vehicle of claim 16, wherein the application content and the vehicle instrument information content is rendered further according to the viewing position and the viewing angle of the driver.

18. The vehicle of claim 17, wherein the processing unit is further configured to perform instructions for:

rendering a first 3D transformation of a content object to the infotainment display according to the viewing position and the view angle of the driver, the 3D world coordinate of the content object in the infotainment display, and the position and orientation of the infotainment display;

rendering a second 3D transformation of said content object to the dashboard display according to the viewing position and the view angle of the driver, the 3D world coordinate of the content object in the dashboard display, and the position and orientation of the dashboard display, wherein said content object rendered to the infotainment display and the dashboard display appears in different perspective views.

19. The vehicle of claim 17, wherein the position of the infotainment display and/or the dashboard display is adjustable.

20. The vehicle of claim 17, wherein the orientation of the infotainment display and/or the dashboard display is adjustable.

* * * * *